United States Patent
Potterveld et al.

[11] Patent Number: 6,167,533
[45] Date of Patent: Dec. 26, 2000

[54] ACTIVE DASHBOARD EXTENSIBLE FRAMEWORK

[75] Inventors: Robert Allen Potterveld; Paul Michael Cesario, both of Fort Collins, Colo.

[73] Assignee: Hewlett-Packard Company, Palo Alto, Calif.

[21] Appl. No.: 09/104,836

[22] Filed: Jun. 25, 1998

[51] Int. Cl.[7] .............................. G06F 9/00; G06F 11/00
[52] U.S. Cl. .................................. 714/25; 714/26; 714/31
[58] Field of Search .................................. 714/26, 31, 25, 714/45, 42, 38, 718; 707/203

[56] References Cited

U.S. PATENT DOCUMENTS

| | | | |
|---|---|---|---|
| 4,672,529 | 6/1987 | Kupersmit | 364/130 |
| 4,965,743 | 10/1990 | Malin et al. | 706/45 |
| 5,325,156 | 6/1994 | Ulinski | 399/8 |
| 5,590,329 | 12/1996 | Goodnow, II et al. | 395/708 |
| 6,009,440 | 12/1999 | Watson et al. | 707/203 |

OTHER PUBLICATIONS

Hewlett Packard HP OpenView, Expose User's Guide, Ch. 5, p. 5–1 thru 5–8 Aug., 1997.

Primary Examiner—Ly V. Hua

[57] ABSTRACT

An initiating engine is instantiated on a first machine to initiate a request for diagnostic information about one or more managed node machines. The request includes an expression to be evaluated and is received by at least one expression engine, each of which can be located on the first machine, on the managed node machine, or on another machine. Each expression engine processes the request by periodically evaluating the expression, obtaining the data required for the expression from one or more managed node machines, and transmitting the results back to the initiating engine. The expression engine can be configured to transmit the results only when the results are different than a previous evaluation of the expression. Furthermore, to detect a failed connection to the expression engine, the initiating engine maintains a heartbeat function to monitor the activities of the expression engine. To facilitate efficient data transfer in a distributed and networked environment, a proxy engine is used to manage the distribution of expressions to at least one expression engine and collect the results for distribution back to the initiating engine. A device selection engine can also be used to determine and configure the one or more managed node machine locations and the one or more expression engine configure the one or more managed node machine locations and the one or more expression engine locations. Special interfaces enable any object that implements these interfaces to be a control engine, a type of initiating engine, or an expression engine.

44 Claims, 12 Drawing Sheets

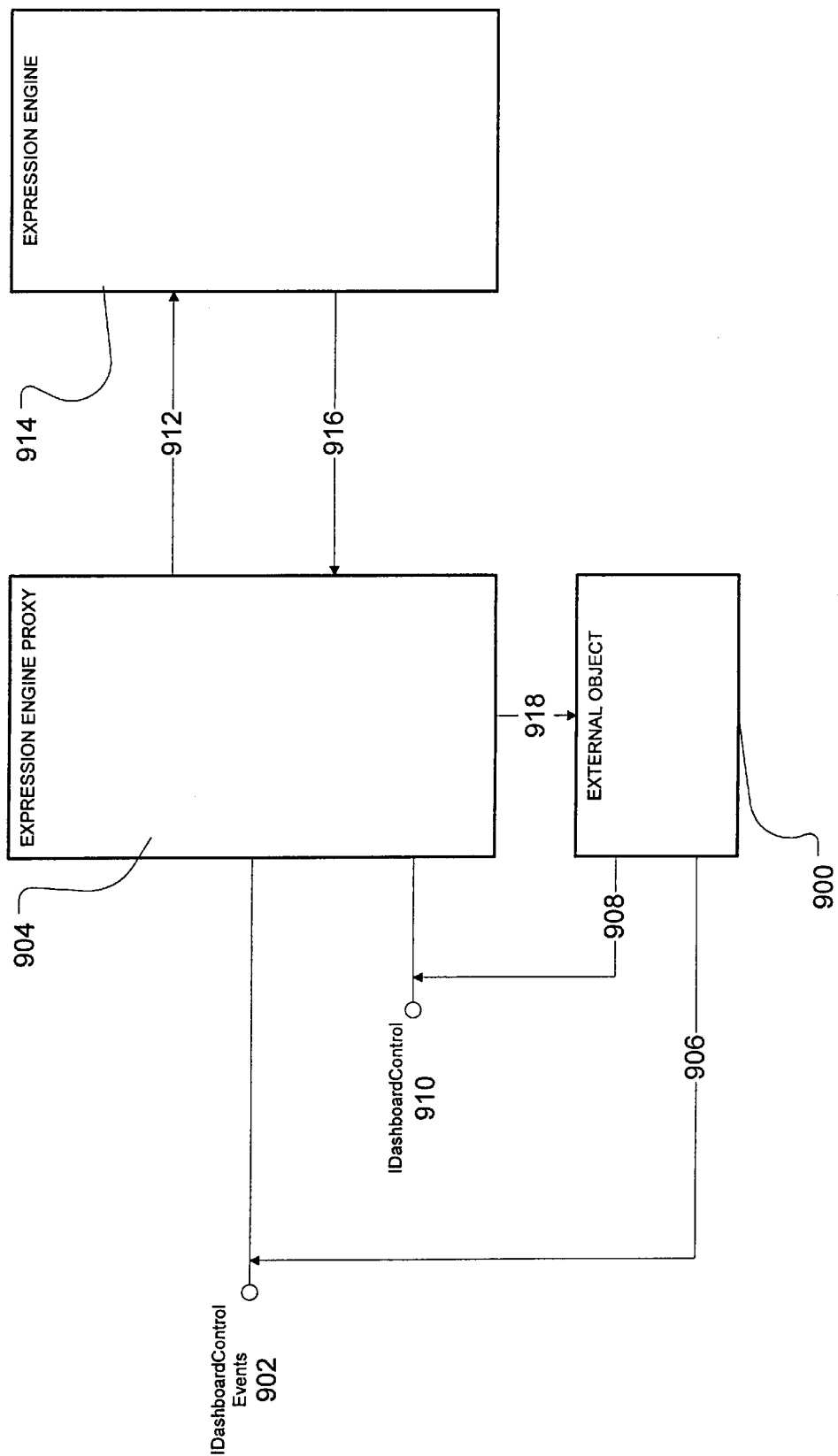

ACTIVE DASHBOARD EXTENSIBLE FRAMEWORK

FIELD OF THE INVENTION

The present invention relates to enterprise management systems that provide various diagnostic information about systems and their components in either centralized or distributed system environments.

BACKGROUND OF THE INVENTION

Experts suggest that the existence of many businesses in the next millennium will in large part depend on their ability to tap into and share information on the Information Superhighway. Whether this is in the form of subscribing to an online internet service or having networked communications intraoffice or interstate, the Information Superhighway is imperative to a business's growth and ability to compete in the marketplace. Recognition of this phenomenon has become commonplace. For small operations, a few or several PC's, a server, and one or more printers linked by a LAN, or local area network, suffices. On a larger scale, there may be an infinite number of PC's, many servers, many printers, and connections made up of both LAN's and WAN's, or wide area networks. Whatever configuration of componentry is utilized, the infrastructure for maintaining such a system can become increasingly complex as an operation expands and more devices are added to the system.

In response to these issues, software developers have manufactured a variety of applications designed to manage an information system. Of particular interest are system diagnostics applications that compile health information about a system, such as how much memory is being used and how much disk space is available.

The basic architecture and process of compiling diagnostic information in an existing system diagnostics application includes:

- A management console, or a machine that displays the diagnostics information.
- A managed node machine, or a machine that contains the component(s) for which diagnostic information is being sought.
- A control engine that dispatches a request for diagnostic information.
- An expression engine that processes the request and returns a response to the management console.

The control and expression engines reside on the management console. When a request is made from the management console, the control engine dispatches this request to the expression engine. The expression engine evaluates this request to determine what managed node machine to obtain the diagnostic information from and then dispatches the same request to the managed node machine. Some process on the managed node machine retrieves the requested data and sends a response back to the expression engine on the management console. The expression engine processes the data and sends the response back to the control engine for display.

While this framework works well in a localized environment, it poses a menace to efficient traffic management in a distributed environment where the managed node machine can be physically located thousands of miles away from the management console. For one, since both engines reside on the management console, a request and a response are transmitted over the network each time the managed node machine is polled for data. Secondly, this "data pull" method causes the control engine to constantly poll for data from the managed node machine, even though data may not have changed. In all scenarios, system resources are unnecessarily consumed, particularly where data has not changed. There is a need, therefore, for a method and system that will efficiently manage compiling diagnostic information such as to alleviate unnecessary consumption of system resources and communication links.

SUMMARY OF THE INVENTION

The Active Dashboard Extensible Framework (ADEF) addresses this and other needs. ADEF is a system and method of compiling diagnostic information for at least one managed node machine in a computer system. ADEF comprises an initiating engine on a first machine and at least one expression engine on a second machine. In ADEF, an expression engine is designated ExpressionEngine, and each ExpressionEngine is associated with one or more managed node machines. The ExpressionEngine receives an expression to evaluate from the initiating engine, obtains the data required to evaluate the expression from the managed node machine, and evaluates the data to generate an expression value, or result of the evaluated expression. The result is then transmitted from the ExpressionEngine back to the initiating engine. This system also comprises the ability for the ExpressionEngine to transmit the result back to the initiating engine only when the result is different from a previous result of the evaluated expression. The location of the ExpressionEngine on a machine as close as possible to the managed node machine enables the ExpressionEngine to retrieve data efficiently. Furthermore, since only one request is sent throughout the application life cycle, and since the ExpressionEngine only returns a response when there is changed data, network traffic is significantly reduced.

In ADEF, an initiating engine can be an external object or a control engine (the control engine being designated ControlEngine in ADEF). An external object is an object developed outside of the ADEF implementation, but which utilizes an ExpressionEngineProxy interface (to be described later), allowing the external object to communicate with the ExpressionEngine. A ControlEngine, on the other hand, is within the ADEF implementation and can be either a DashboardControl or a DashboardBackgroundControl. Both of these engines implement the same interface, but the DashboardControl processes the results of an evaluated expression by displaying a user interface such as a dashboard control, and the DashboardBackgroundControl delegates processing of the results by generating an event to an event receiver which processes the results. Throughout the specification and the claims, a ControlEngine represents both a DashboardControl and a DashboardBackgroundControl, and where the functionality of the DashboardControl and DashboardBackgroundControl differs, each control engine will be referred to individually.

The ADEF architecture may also include a proxy engine and/or device selection engine. The proxy engine, or ExpressionEngineProxy, can receive requests from the initiating engine and distribute these requests to the ExpressionEngine. The ExpressionEngineProxy supports an environment where there are multiple managed node machines by managing the number of ExpressionEngines to create given the number and type of managed node machines there are. The ExpressionEngineProxy distributes the request to one or more ExpressionEngines, compiles the results from one or more ExpressionEngines, and distributes the results back to the initiating engine. The device selection engine, or DeviceSelection, can also be used in ADEF. The DeviceSelection configures the location of one or more managed node machines and one or more ExpressionEngine machines at runtime, rather than having these locations preconfigured in the properties of the initiating engine (to be discussed).

ADEF further comprises interfaces that enable any object that implements the IDashboardControl interface to act as a ControlEngine, and any object that implements the IExpEngine interface to act as an ExpressionEngine, therefore enabling the object to utilize the ADEF architecture and process. The IDashboardControl allows a developer to create a custom ControlEngine without having to recreate the entire object. The ExpEngine interface allows a developer to create an ExpressionEngine in any supported expression language. The use of these interfaces provides a framework for allowing any DashboardControl to communicate with any ExpressionEngine within the ADEF architecture.

In a typical ADEF implementation, the ControlEngine is created on the management console when the application is opened. A ControlEngine may be created by a container such as a script in an HTML (HyperText Markup Language) Page, a web browser, or other application. Furthermore, an ADEF application may reside in both web-based and non web-based applications. When the ExpressionEngine is created, it can reside on the management console or any other machine.

In a first preferred embodiment of the present invention, a ControlEngine requests diagnostic information about a component on a managed node machine and dispatches this request. The ControlEngine maintains a number of configurable properties as part of the IDashboardControl interface. These properties enable the ExpressionEngine to be created on a machine other than the management console, regulate the intervals at which the ExpressionEngine retrieves data from the managed node machine, and define whether all results should be returned to the ControlEngine or only results that have changed since the last evaluation. (The ControlEngine maintains a number of other properties which will be discussed in a later section.) Throughout its life cycle, the ControlEngine also calls a Heartbeat Method of the ExpressionEngine to check its connection to the ExpressionEngine. The ExpressionEngine then receives and processes the request from the ControlEngine, and returns a response. The ExpressionEngine also maintains configurable properties which are a subset of the ControlEngine properties. Furthermore, the ExpressionEngine is active, or intelligent, in that it processes the request from the ControlEngine only at defined intervals, and can be configured to return the results of an evaluated expression only if the results of the evaluated expression have changed since the expression was last evaluated.

In a variation of the first embodiment, a DashboardControl is used to initiate a request to evaluate an expression and then display the results to a dashboard. The DashboardControl creates an ExpressionEngineProxy on the management console, which in turn creates at least one ExpressionEngine on the managed node machine or on the machine closest to the managed node machine if the managed node machine cannot host the expression engine (such is the case where a printer is the managed node machine). The original request is dispatched from the DashboardControl which sends this request to the ExpressionEngineProxy. The ExpressionEngineProxy then sends the request to at least one ExpressionEngine. Each ExpressionEngine processes this request at the designated intervals, retrieves the expression values from its one or more managed node machines, and transmits the results to the ExpressionEngineProxy only if the results have changed. The ExpressionEngineProxy compiles the results and transmits the results back to the DashboardControl which then draws the control and assigns the results to the control.

In another variation of the first preferred embodiment, a DashboardBackgroundControl is used to initiate a request to evaluate an expression and uses the results to generate an event that is captured and processed by an event receiver. The DashboardBackgroundControl is created and configured in the same way that a DashboardControl is created and configured. The DashboardBackgroundControl also creates and configures an ExpressionEngineProxy which then creates at least one ExpressionEngine. The ExpressionEngine evaluates the expression and transmits the results of the evaluated expression to the ExpressionEngineProxy. The ExpressionEngineProxy compiles the results and transmits them to the DashboardBackgroundControl. The DashboardBackgroundControl fires a predefined event (which can be drawing the dashboard control) to the event receiver, such as a control container.

In a second preferred embodiment of the invention, an external object requests diagnostic information about a component on a managed node machine. The external object implements the IDashboardControlEvents interface of the ExpressionEngineProxy to enable it to receive events from the ExpressionEngineProxy. The external object initializes the ExpressionEngineProxy through the ExpressionEngineProxy's IDashboardControl interface. Standard processing takes place whereby the ExpressionEngineProxy creates the ExpressionEngine and the ExpressionEngine evaluates the expression. The ExpressionEngineProxy receives the results, but instead of passing the results to the ControlEngine, the ExpressionEngineProxy fires an event to the external object. The external object then processes the evaluated expression as it sees fit.

Other details and advantages of ADEF will be discussed, or become apparent, in the following description, drawings, and claims.

BRIEF DESCRIPTION OF THE DRAWING

FIG. 9 illustrates the second preferred embodiment of compiling diagnostic information where an external object is used to initiate a request.

DETAILED DESCRIPTION OF THE PREFERRED EMBODIMENTS

Figure 1:
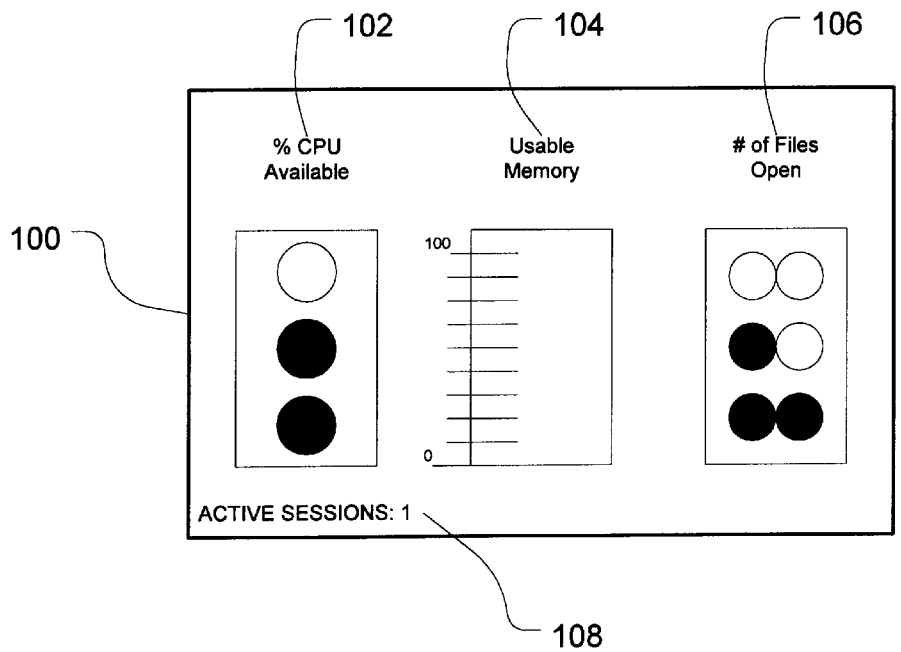
FIG. 1 illustrates the user end of a system diagnostics application.

FIG. 1 illustrates the user end of a system diagnostics application. This display 100 contains four different representations of the status of one or more components: a stoplight 102, a chart 104, a pegboard 106, and a status string 108. Each of these representations is a dashboard control.

Figure 2:
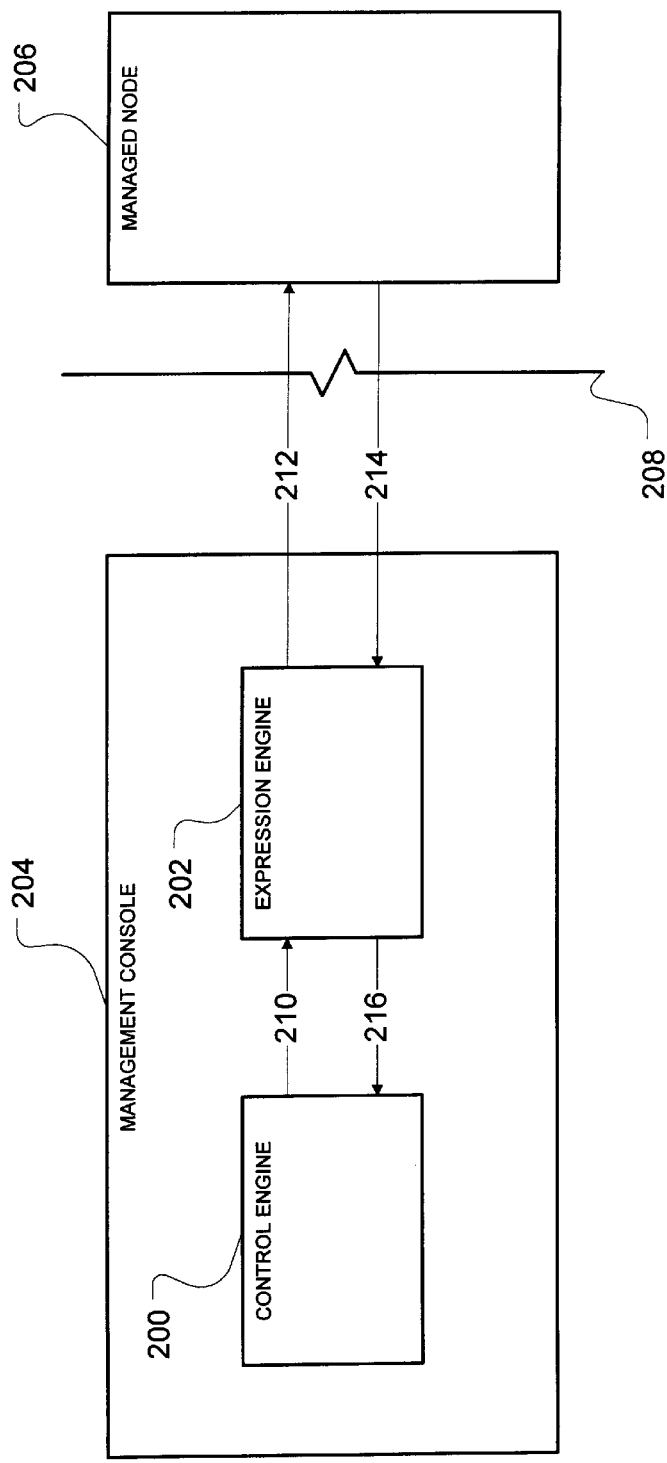
FIG. 2 illustrates the architecture of other system diagnostics applications.

The architecture underlying other system diagnostics applications is depicted in FIG. 2. Here, the control engine 200 and the expression engine 202 both reside on the same machine, the management console 204. The managed node machine 206 contains the data needed to evaluate an expression and is oftentimes located across a network 208. The control engine dispatches a request 210 to the expression engine at intervals, causing a corresponding request 212 to be sent from the expression engine on the management console across the network to the managed node machine. The managed node machine then sends 214 a response back to the expression engine on the management console, which in turn sends 216 that response back to the control engine to display the results to a dashboard. Therefore, there is one corresponding response for each and every request dispatched.

Figure 3:
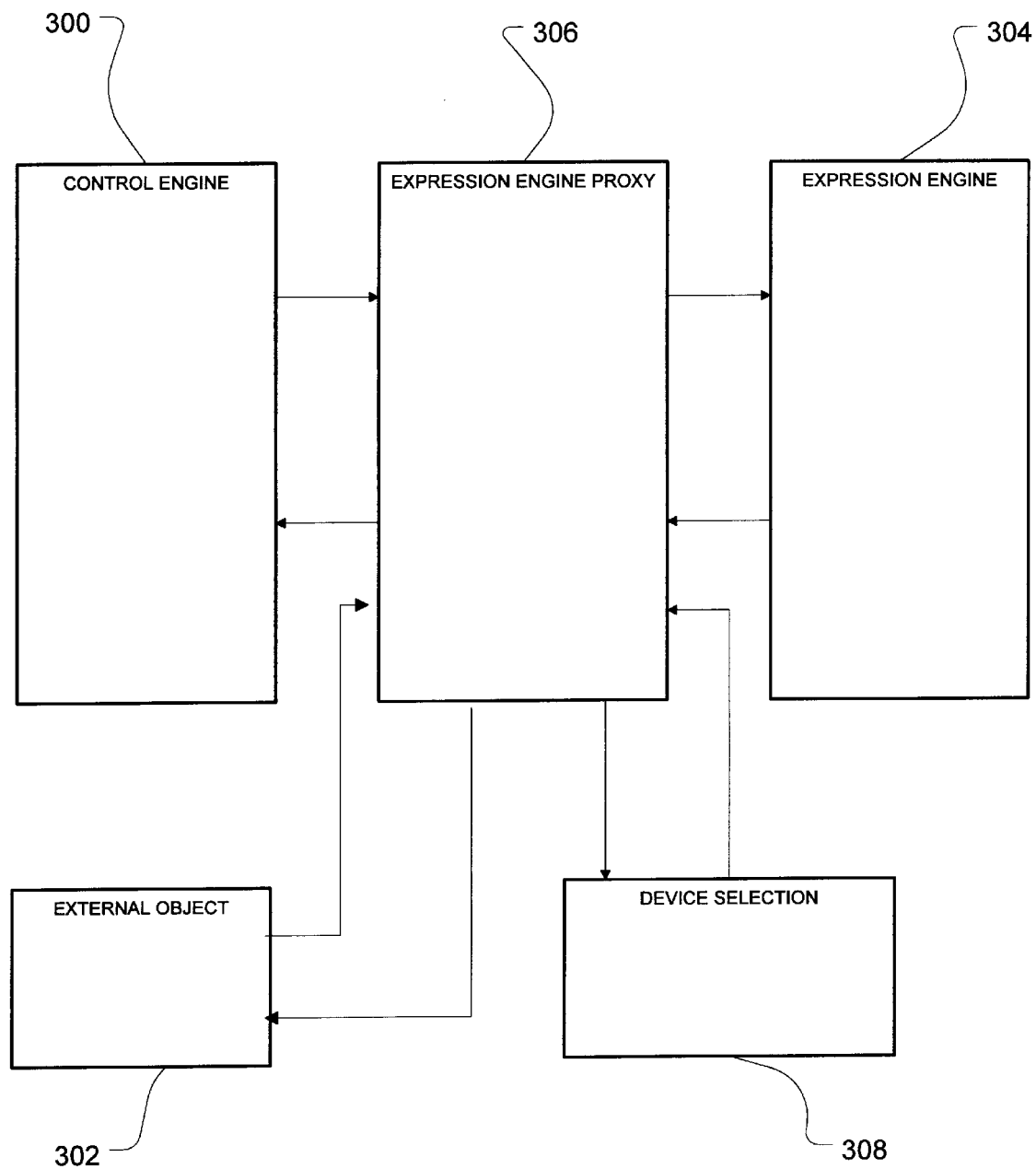
FIG. 3 illustrates the architecture of an ADEF system diagnostics application.
Figure 4A:
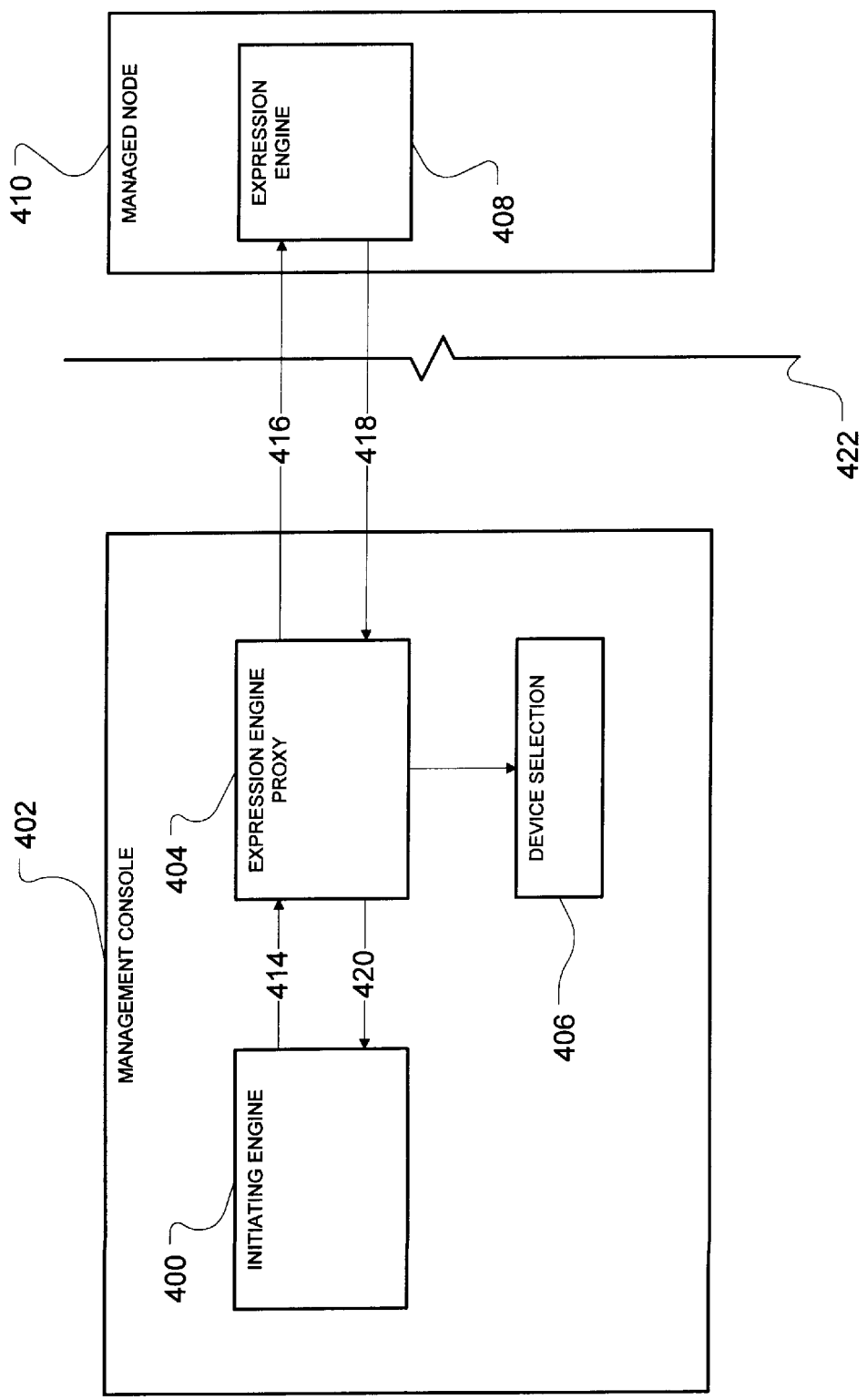
FIG. 4A depicts the architecture embodied in ADEF where the ExpressionEngine is created on the managed node machine.
Figure 4B:
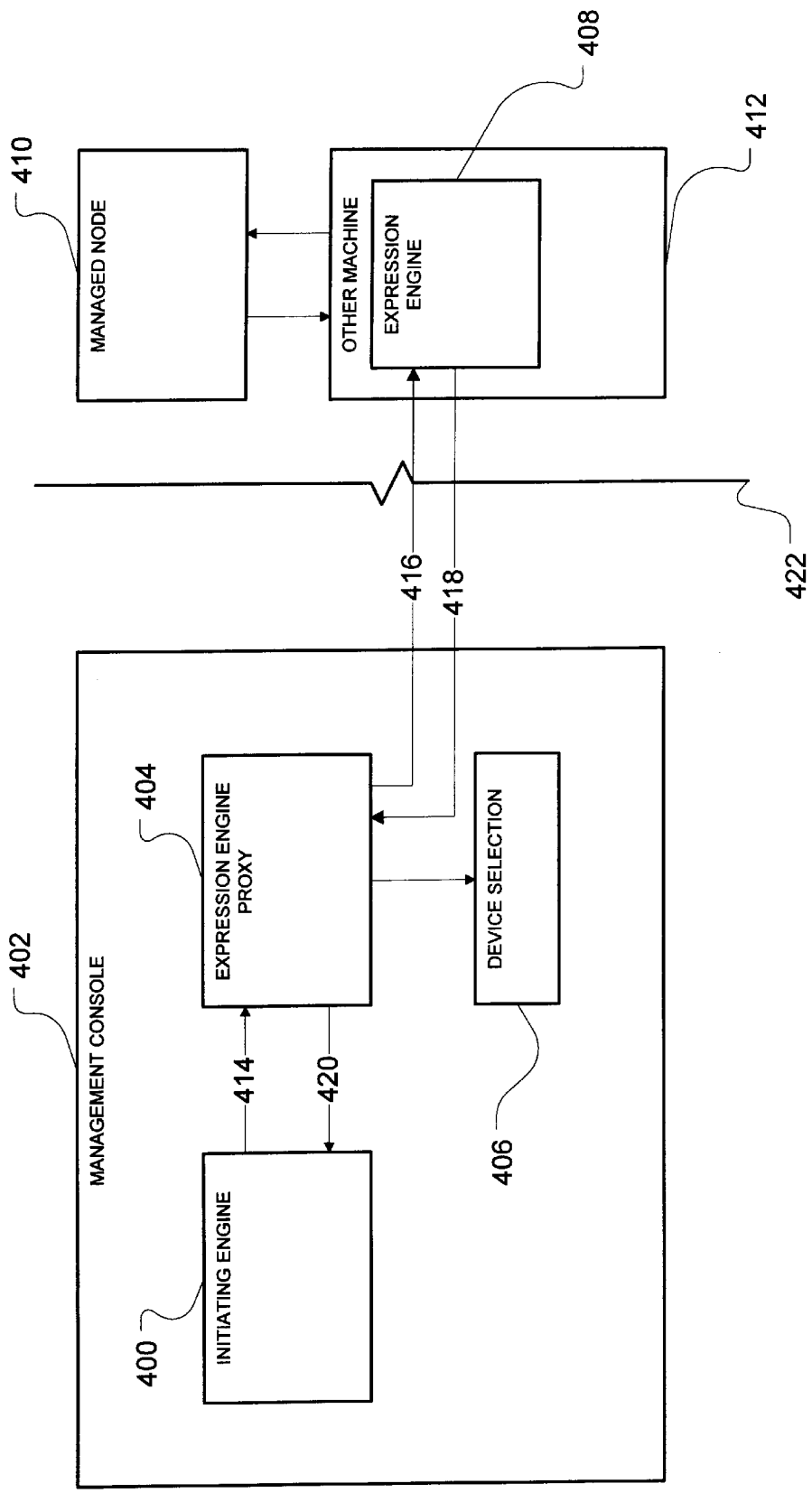
FIG. 4B depicts the architecture embodied in ADEF where the ExpressionEngine is created on the machine closest to the managed node machine.

The architecture and process underlying the system diagnostics application described herein is called an Active Dashboard Extensible Framework (ADEF) as illustrated in FIG. 3. In ADEF, the initiating engine can be a ControlEngine 300 or an external object 302. In addition to the initiating engine, the ADEF architecture includes an Expression Engine 304, and may include an ExpressionEngineProxy 306 and/or a DeviceSelection 308. In reference to FIG. 4A, the ADEF architecture is implemented such that the initiating engine 400 may reside on the management console 402 with the ExpressionEngineProxy 404 and the DeviceSelection 406, and the ExpressionEngine 408 can reside on the management console or on the managed node machine 410. As depicted in FIG. 4B, the ExpressionEngine can also reside on some other machine 412 nearest the managed node machine which would be the case when a managed node machine is not a device that can host an ExpressionEngine, such as a printer device. Additionally, the architecture enables the initiating engine to dispatch 414 only one request to the ExpressionEngineProxy 404 for the lifetime of the ADEF application, which sends 416 that same request only once to the ExpressionEngine 408. Unlike other applications, the ADEF ExpressionEngine is responsible for processing the request at designated intervals, and only sends back a response to the ExpressionEngineProxy 404 (which in turn sends 420 that response back to the initiating engine 400) when the results have changed since the expression was last evaluated. This system of compiling information alleviates traffic on the network 422 since only one request packet is sent, and response packets which do not provide new information are not continuously returned to the initiating engine.

ADEF further comprises interfaces that enable any object that utilizes these interfaces to connect to the ADEF architecture and utilize the ADEF process. (FIG. 5) A developer can create a custom initiating engine 500 to use in ADEF by implementing the IDashboardControl interface 502. The IDashboardControl interface definition includes the following properties:

ExpressionEngineClassID—an identifier that defines the specifications for the type of expression engine to create.

Expression—an expression to be evaluated.

Value—a variant data type (floating point number, integer number, string, array of variant data types, etc.) representing the evaluated expression.

Target—defines the location of the managed node machine or group of managed node machines that the dashboard is displaying information about.

ExpressionEngineLocation—defines the location where the ExpressionEngine should be created and executed.

Interval—defines how often an expression should be evaluated.

ResponseStateInterval—defines how often the initiating engine should check its connection to the ExpressionEngine by calling the Heartbeat Method of the ExpressionEngine.

SendContinuous—defines whether the ExpressionEngine should send all results to the initiating engine or send them only if the results are different than results generated from a previous evaluation of the expression.

ResponseState—indicates whether the connection to the ExpressionEngine is successful or not, and is updated by the Heartbeat Method of the ExpressionEngine.

The IDashboardControl interface also includes the following methods: the Activate Method 506 to start expression evaluation process; the Deactivate Method 508 to end the expression evaluation process; and SetValue Method 510 to receive the results of an evaluated expression.

The other ADEF interface is called the IExpEngine interface 512. This interface allows a developer to create an ExpressionEngine 514 in any supported expression language by utilizing the IExpEngine interface. The IExpEngine interface includes the following methods: the Initialize Method 516 to initialize the ExpressionEngine; the Finished Method 518 to stop the ExpressionEngine from evaluating expressions; and the Heartbeat Method 520 to monitor the activity of the ExpressionEngine.

Throughout the specifications and claims, the following terminology will be used:

Expression: represents the specific data to evaluate. For example, "Disk.PercentFreeSpace.*" is an expression to calculate the total percentage of space available for all disk drives on a managed node machine. Expressions are passed to the ExpressionEngineProxy.

Data Instance: each instance of the expression that is found, i.e. the percentage of available space on one disk drive, is called a data instance. Data instances are found on the one or more managed node machines and there is at least one data instance for each expression.

Expression Value: the calculated value of the expression as determined by the ExpressionEngine.

Data: the expression is evaluated over a set of data instances to generate data. Data can be multiple values of a parsed expression which the ExpressionEngine uses to calculate the expression value. For example, if the expression is "Total Disk Space—Free Disk Space", then the ExpressionEngine can poll the managed node machine for two data points ("Total Disk Space" and "Free Disk Space") to obtain data which the ExpressionEngine then uses to calculate the expression value. Data can also be the expression value where there is not a parsed expression, or where the managed node machine has a smart agent that can parse and calculate the expression. Data is generated from the managed node machine and passed back to the ExpressionEngine.

Results: the aggregate of expression values which can take the form of a single expression value or an array of expression values, where the array is an N-dimensional array and N is the number of data instances of the expression evaluated. Results are generated by the ExpressionEngine and passed to the ExpressionEngineProxy and then to the initiating engine.

A dashboard in ADEF can be displayed in any container such as the following: a web page using Internet Explorer®, Netscape Navigator®, or other compatible web browser; an application using a web browser to display web pages; or another application.

Figure 5:
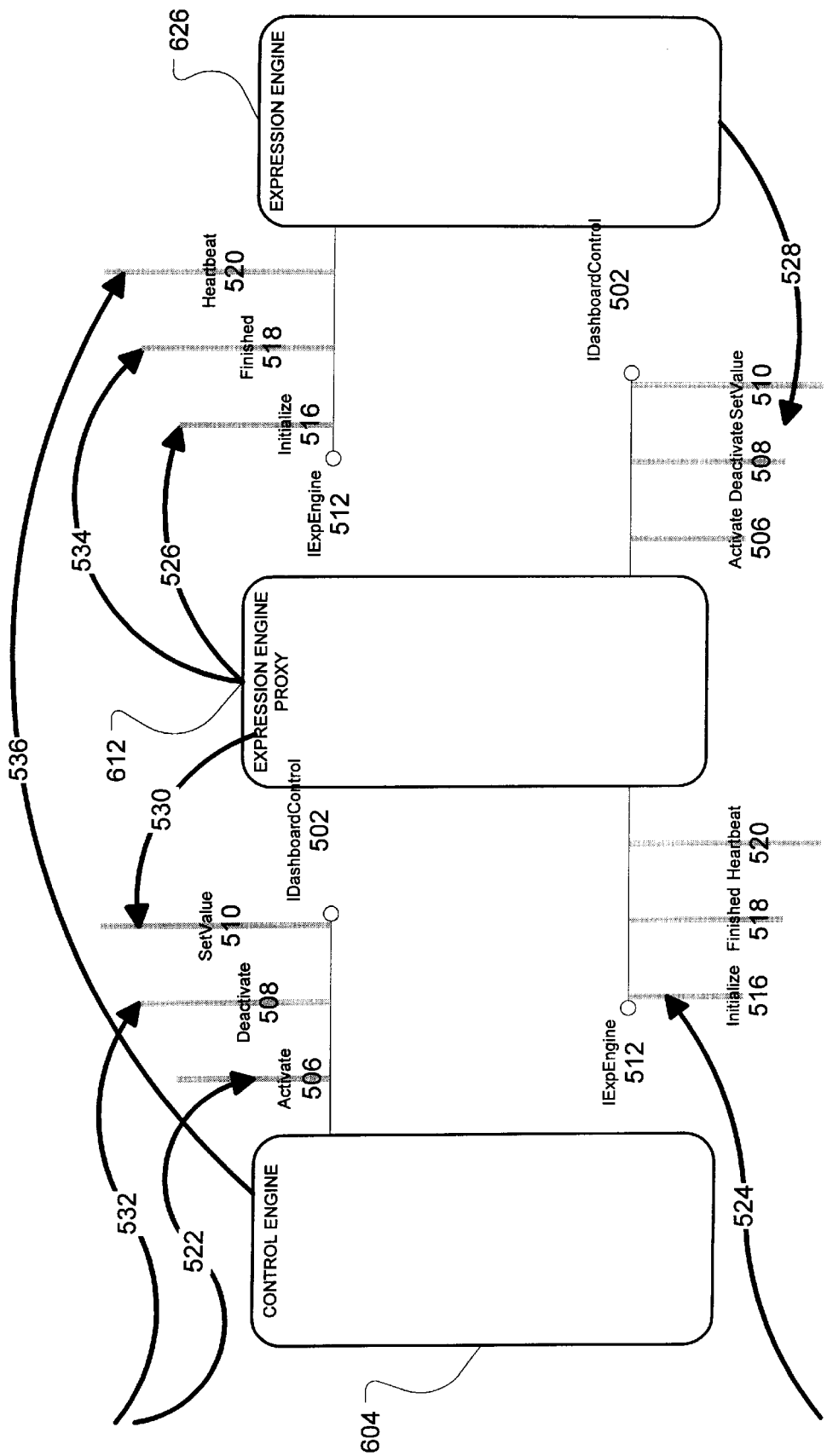
FIG. 5 illustrates the interfaces of ADEF and their respective methods.
Figure 6:
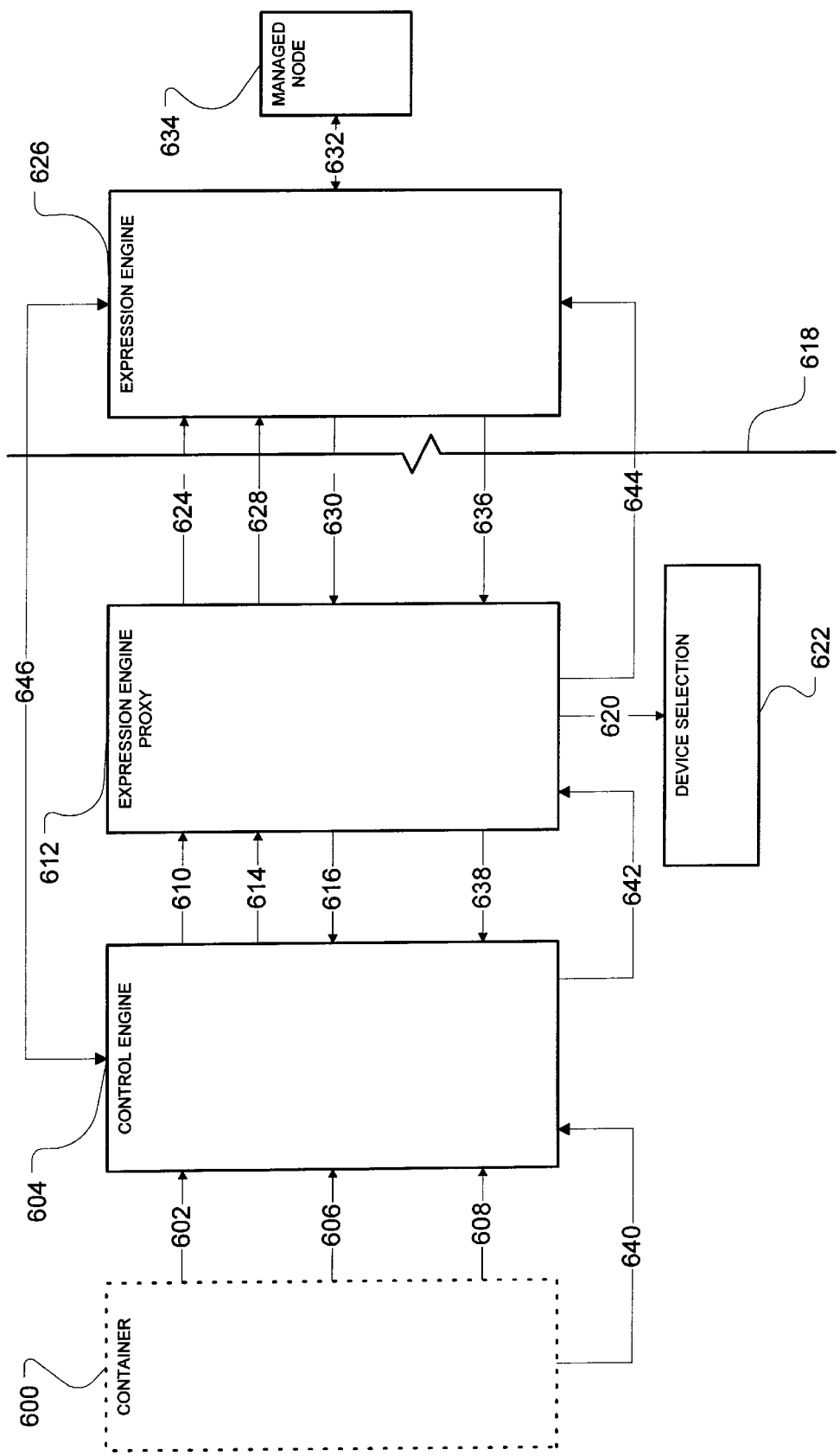
FIG. 6 illustrates a first embodiment of compiling diagnostic information where a ControlEngine is used to initiate a request.

In a first preferred embodiment, the initiating engine is a ControlEngine. Referring to FIGS. 5 and 6, a series of instructions in the container 600 creates 602 the ControlEngine 604 and configures 606 it with properties for the IDashboardControl interface. The container then activates 608 the ControlEngine by calling 522 the Activate Method 506 of the IDashboardControl interface on the ControlEngine, instructing it to invoke the actions necessary to start compiling diagnostic information.

The ControlEngine creates 610 the ExpressionEngineProxy 612 (the Proxy) on the management console. It then initializes 614 the Proxy by calling 524 the Initialize Method of the IExpEngine interface on the Proxy. Together, the steps of creating and initializing are sometimes referred to in the claims as "instantiating". Instantiating may also comprise other and/or different steps, and means that an object is brought into being by some means. The Proxy retrieves 616 properties of the ControlEngine (perhaps all of them) to configure itself. The Proxy may then need to lower the default security connect level to enable the ExpressionEngine to cross the network barriers 618 to call back into the Proxy. Once it does this, the Proxy evaluates the properties inherited from the ControlEngine. If the Target has a value of null, the Proxy calls 620 the DeviceSelection 622 component to determine the one or more managed node machines for the Target property of the Proxy. If the ExpressionEngineLocation is null, the DeviceSelection component will determine the one or more locations for this property, which could be the location of the managed node machine or the location of the machine nearest the one or more managed node machines.

The Proxy creates 624 an ExpressionEngine 626 of the object type ExpressionEngineClassID on or nearest the one or more managed node machines indicated by the ExpressionEngineLocation, assuming that an ExpressionEngine of that type on the same machine is not already active. If there are data instances of the expression on multiple managed node machines, the Proxy can create any number of ExpressionEngines to assign to the managed node machines based on the complexity of the expression as well as the ExpressionEngineClassID, Target, and ExpressionEngineLocation properties it receives from the ControlEngine and/or the DeviceSelection component. The Proxy then initializes 628 each ExpressionEngine by calling 526 the Initialize Method 516 of the IExpEngine interface on the ExpressionEngine.

The ExpressionEngine may retrieve 630 the Expression, Interval, SendContinuous, and Target properties from the Proxy to configure itself. The ExpressionEngine reads the expression and retrieves 632 the data from the one or more managed node machines 634 designated by Target. The ExpressionEngine evaluates the data to generate an expression value, and then caches the expression value for comparison with the expression value at the next Interval. If the current expression value is different than the last saved expression value, then the ExpressionEngine passes the results back to the Proxy. If the current expression value is the same as the last saved expression value, the ExpressionEngine will evaluate the SendContinuous property. If SendContinuous is false, indicating that results should only be sent if the expression value is different than the expression value of the previous cycle, then the results will not be passed to the Proxy. If SendContinuous is true, indicating that all results should be sent back, then the ExpressionEngine will pass the results to the Proxy. The ExpressionEngine repeats this evaluation process at the predefined Intervals until it is instructed to finish its processing.

The ExpressionEngine passes 636 the results of the evaluated expression to the Proxy by calling 528 the SetValue Method 510 of the IDashboardControl interface on the Proxy. The Proxy passes 638 the results back to the ControlEngine for processing by calling 530 the SetValue Method 510 of the IDashboardControl interface on the ControlEngine. Where only one data instance of the expression exists on any given machine, and only one data instance of an expression is found across multiple machines, the results are in the form of a single expression value which the Proxy will pass back to the ControlEngine. However, if more than one data instance is found on any one machine or across multiple machines, the results can be in the form of a single expression value, or an array of expression values. The Proxy decides whether to aggregate these results and what combinations to aggregate these results in prior to passing the results back to the ControlEngine.

Changes to the expression value are continually captured and represented by the ControlEngine until the ADEF application is closed. At that time, the container deactivates 640 the ControlEngine by calling 532 the Deactivate Method 508 of the IDashboardControl interface on the ControlEngine, and the ControlEngine then instructs the Proxy to finish 642. When the Proxy instructs the ExpressionEngine to finish 644 by calling 534 the Finished Method 518 of the IExpEngine interface on the ExpressionEngine, the ADEF application is terminated.

Throughout the ControlEngine's life cycle, it will periodically call 536, 646 the Heartbeat Method 520 of the IExpEngine interface on the ExpressionEngine to detect if a connection to the ExpressionEngine has been broken. At every ResponseStateInterval, one of the properties of the ControlEngine, the ControlEngine will check the ExpressionEngine to ensure that the ExpressionEngine is returning values to the Proxy. The ResponseStateInterval should be configured at larger intervals than the ControlEngine Interval property to allow the ControlEngine ample time to capture at least one instance of the ExpressionEngine returning an expression value to the Proxy. If the ControlEngine detects a return value, the ResponseState property of the ControlEngine indicates a success and nothing happens. If no return value is detected, the ResponseState will indicate a failure and the ControlEngine will fire a ResponseStateChange event to the container. If, on the next ResponseStateInterval, the prior ResponseState indicates a failure and the current ResponseState indicates a success, a ResponseStateChange event is fired indicating the Control Engine has started to receive data again. At any point when the container receives a failed response from the ResponseStateChange event, it may choose to ignore it or it may choose to delete the ControlEngine that has the bad connection and recreate it.

Figure 7A:
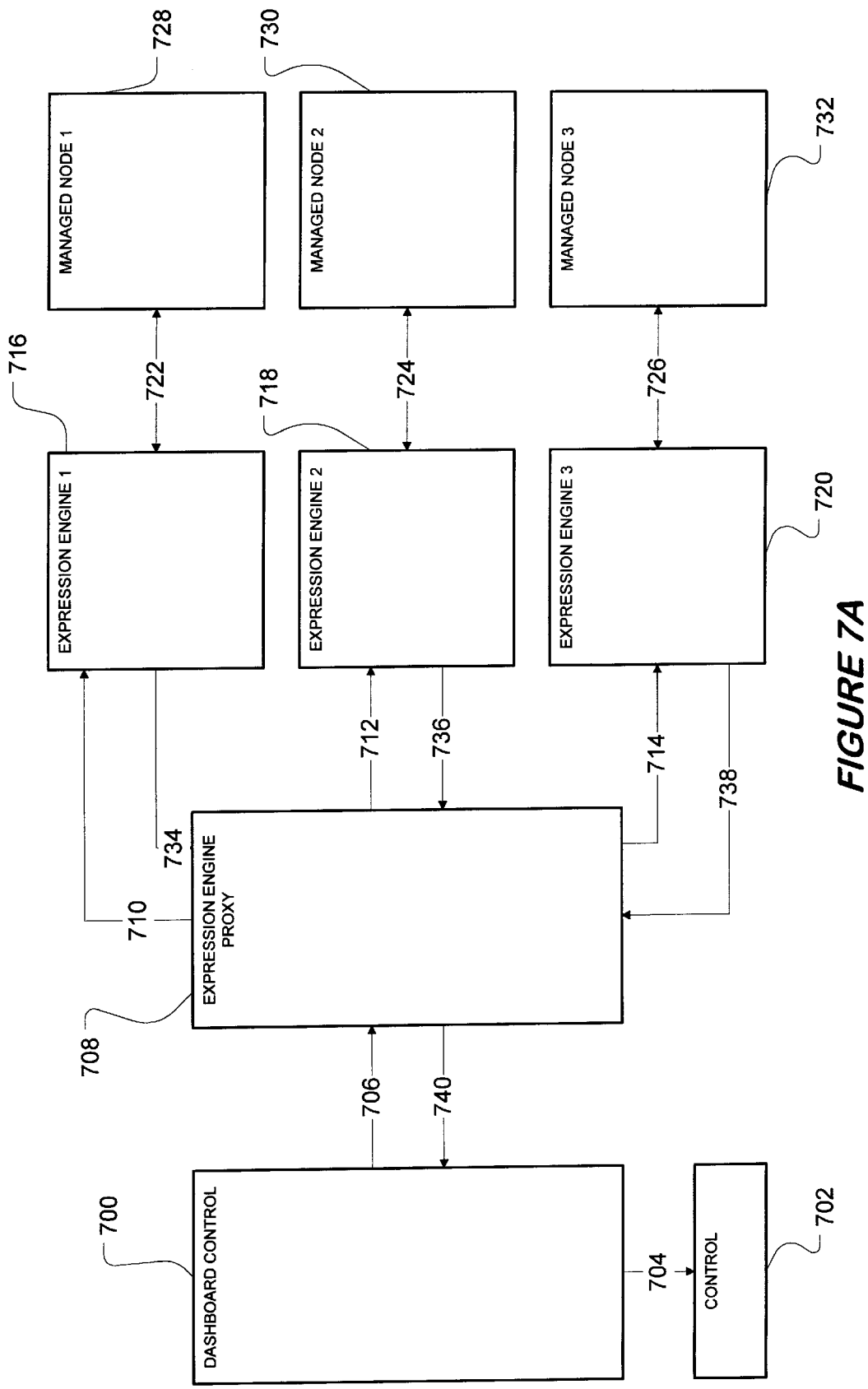
FIG. 7A illustrates a variation of the first preferred embodiment where a DashboardControl is the ControlEngine that draws a control where there is one ExpressionEngine for each managed node machine.

In a variation of the first preferred embodiment, as depicted in FIG. 7A, the ControlEngine is a DashboardControl 700 that draws the control 702 onto the dashboard and assigns 704 the results to the control.

Figure 7B:
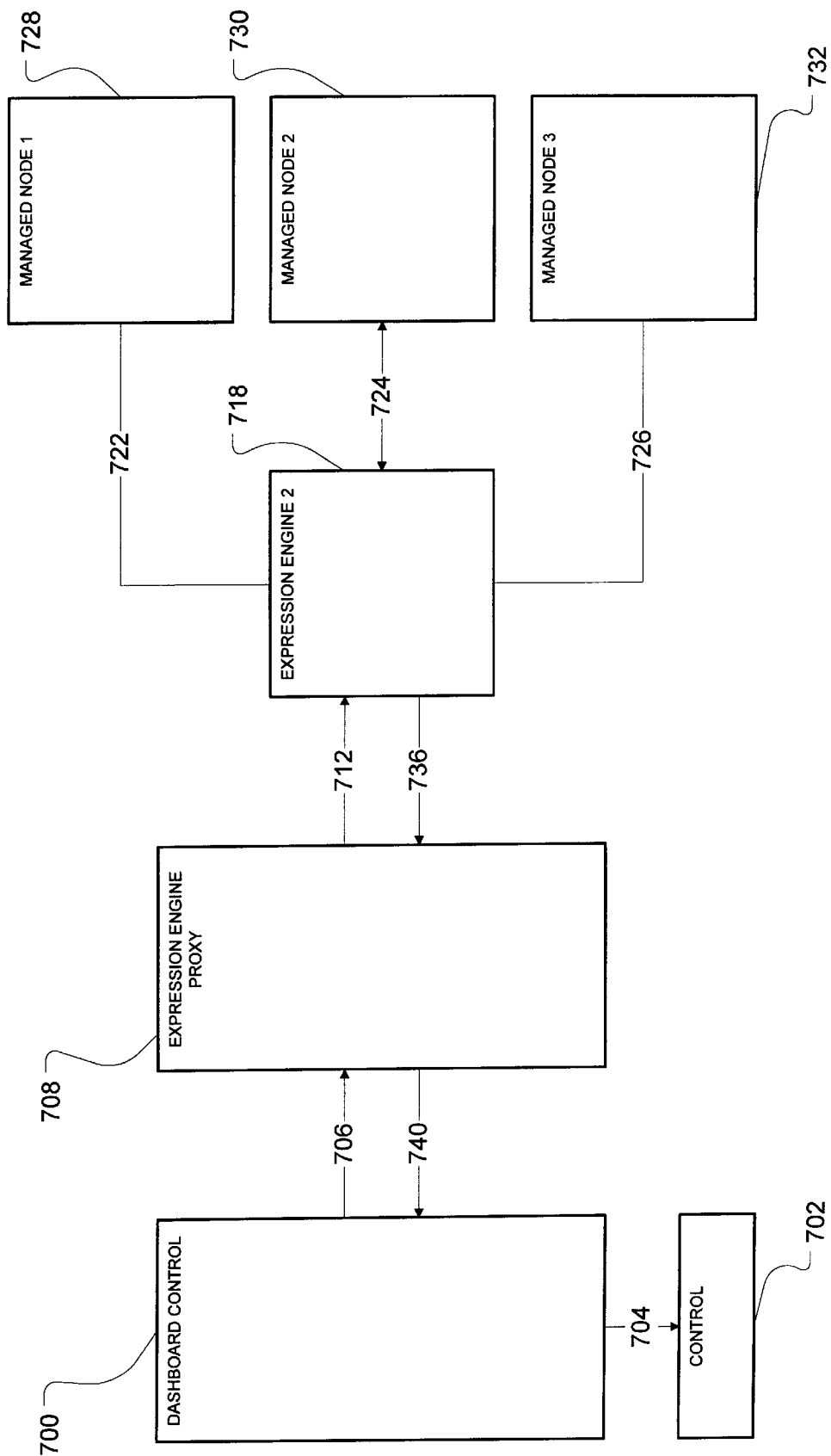
FIG. 7B illustrates a variation of this where there is one ExpressionEngine for multiple managed node machines.

For example, a DashboardControl residing on the management console on Machine A 718 requests the total time that Machine B 728, Machine C 730, and Machine D 732 have been operational since the network was last started. The DashboardControl is configured for the expression "System Up Time", for example, and the Targets are configured for the locations of managed node machines B, C, and D, either by the DashboardControl properties or the DeviceSelection component. In this example, the DashboardControl creates 706 the Proxy 708 which creates 710, 712, 714 one ExpressionEngine 716, 718, 720 for each managed node machine 728, 730, 732. (FIG. 7B depicts a scenario where the Proxy creates 712 one ExpressionEngine 718 to service all three managed node machines 728, 730, 732. The point is that there does not have to be a one-to-one correspondence between the number of ExpressionEngines and managed node machines.) The Proxy then distributes the expression to be evaluated to each of the ExpressionEngines. The ExpressionEngines obtain 722, 724, 726 the expression value from the associated managed node machine and pass 734, 736, 738 the results back to the Proxy. The Proxy assembles the results and passes 740 the results back to the DashboardControl, enabling the control on the dashboard to show how much time all three machines have been operational.

Figure 8A:
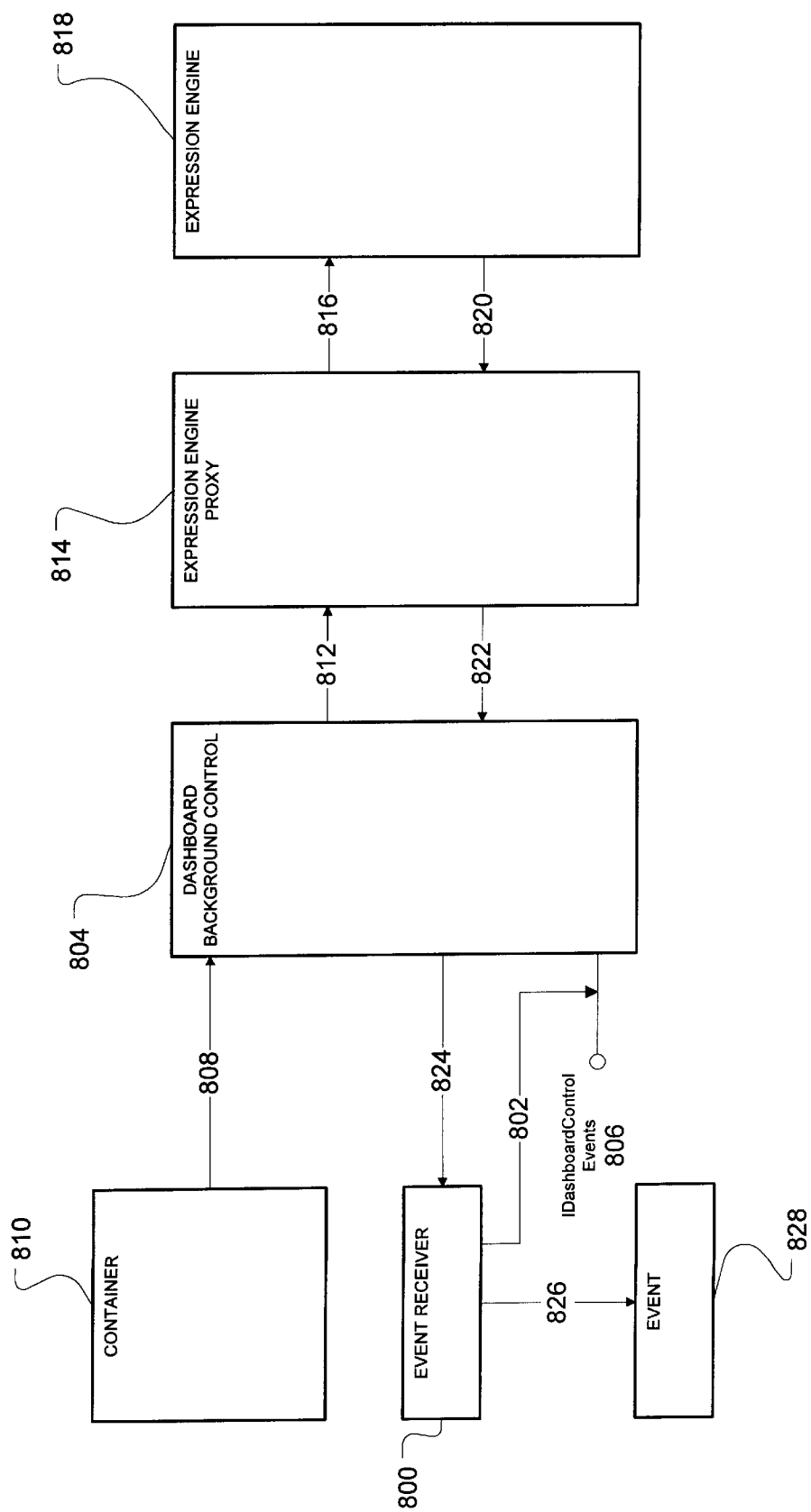
FIG. 8A illustrates another variation of the first preferred embodiment where a DashboardBackgroundControl is the ControlEngine that generates an event that is captured by an event receiver for processing.

In another variation of the first preferred embodiment of the invention, as depicted in FIG. 8A, the ControlEngine is a DashboardBackgroundControl that generates a predefined event that is captured and processed by an event receiver. In this variation, an event receiver 800 registers 802 itself with the DashboardBackgroundControl 804 using the IDashboardControlEvents interface 806 of the DashboardBackgroundControl. The DashboardBackgroundControl is created and configured 808 by a control container 810 and sends 812 an expression to the Proxy 814 which turns around and sends 816 it to the ExpressionEngine 818. The ExpressionEngine evaluates the expression and sends 820 the results to the Proxy which sends 822 the results to the DashboardBackgroundControl. the DashboardBackgroundControl then fires 824 a predefined event to the event receiver which captures and processes 826 the external event 828.

Figure 8B:
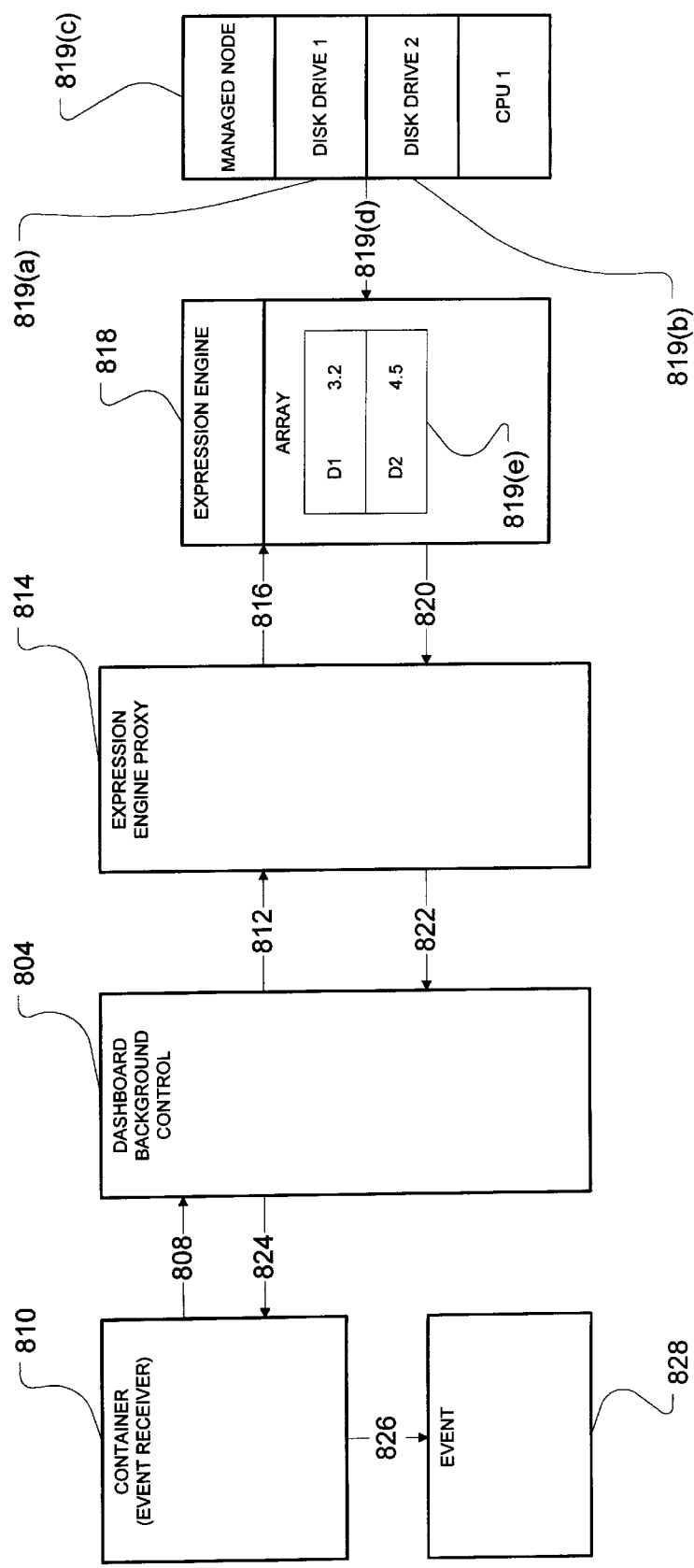
FIG. 8B is an example of this variation where the event receiver is actually the control container in the case where there are multiple data instances of an expression on a single managed node.

An example of how a DashboardBackgroundControl is used is where multiple data instances of an expression exist on a single machine, as illustrated in FIG. 8B. For example, a management node requests the total amount of space available for all disk drives on a particular machine or the amount of disk space available for each disk drive in a detailed representation. The dashboard must graphically or textually represent a variable number of data instances of the expression, the amount of space available on each disk drive, where this number of data instances is not necessarily known at design time for a particular machine. In this example, a container 810 creates and configures 808 a DashboardBackgroundControl 804 instead of a DashboardControl. Standard processing resumes wherein the DashboardBackgroundControl passes 812 the expression to be evaluated to the ExpressionEngineProxy 814. The ExpressionEngineProxy creates 816 the ExpressionEngine 818, passing in the expression. When the ExpressionEngine determines that two data instances 819(*a*), 819(*b*) of the expression exist on the managed node machine 819(*c*), it packages 819(*d*) together a data instance and corresponding expression value into one row of the array 819(*e*) for each data instance of the expression that it encounters. When all instances have been evaluated and written to the array, the ExpressionEngine passes 820 the array to the ExpressionEngineProxy which passes 822 the array to the DashboardBackgroundControl. The DashboardBackgroundControl generates 824 a predefined event (including the array) to the event receiver 810, which in this case is also the control container. The event receiver then captures this event and processes 826 the event 828. In this case, the control container processes the event by using a script to read each row of the array and visually displaying this data on the dashboard.

In a second preferred embodiment of the invention, as depicted in FIG. 9, an external object is used to initiate a request to evaluate an expression and process an external event. In this embodiment, the ExpressionEngine is used independently of a ControlEngine in the case where an external object only needs to be notified that an expression value has changed and wishes to process it in some other way. The external object 900 must utilize the IDashboardControlEvents interface 902 of the Proxy 904 to attach 906 itself to the Proxy. The external object configures 908 the Proxy through the IDashboardControl interface 910 implemented by the Proxy which passes 912 this configuration to the ExpressionEngine 914 which evaluates the expression. The ExpressionEngine passes 916 the results of the evaluated expression to the Proxy. The Proxy receives the results of the evaluated expression and communicates 918 changes to the external object, which then processes the results as it sees fit.

While illustrative and presently preferred embodiments of the invention have been described in detail, it is to be understood that the inventive concepts may be otherwise variously embodied and that the appended claims are intended to be construed to include such variations except as limited by prior art.

What is claimed is:

1. A computer implemented method of compiling diagnostic information for at least one managed node machine of a computer system, comprising:
   a) instantiating an initiating engine on a first machine;
   b) instantiating a first expression engine on a second machine, said first expression engine being associated with a first of the at least one managed node machine;
   c) passing a first expression from said initiating engine to said first expression engine;
   d) said first expression engine periodically,
      i) obtaining from said first of the at least one managed node machine, data required to evaluate said first expression; and
      ii) evaluating said first expression utilizing said data obtained from said first of the at least one managed node machine, thereby generating a result; and
   e) said first expression engine transmitting selected ones of said results to said initiating engine.

2. A computer implemented method as in claim 1, wherein the selected ones of said results comprise results which differ from a previous result of said periodic evaluation of said first expression.

3. A computer implemented method as in claim 2, wherein said previous result immediately precedes a selected one of said results.

4. A computer implemented method as in claim 2, further comprising, at intervals, said initiating engine calling a heartbeat method of the first expression engine.

5. A computer implemented method as in claim 1, further comprising instantiating a proxy engine, wherein:
   a) said passing of the first expression from said initiating engine to said first expression engine comprises passing said first expression through said proxy engine; and
   b) said transmission of selected ones of said results from said first expression engine to said initiating engine comprises transmitting said selected ones of said results through said proxy engine.

6. A computer implemented method as in claim 5, wherein said proxy engine is instantiated on said first machine.

7. A computer implemented method as in claim 5, further comprising:
   a) instantiating a device selection component; and
   b) said proxy engine,
      i) receiving from said device selection component an indication as to which managed node machines comprise the at least one managed node machine;
      ii) receiving from said device selection component an indication as to where said first expression engine will be instantiated; and
      iii) determining said association between said first expression engine and said first of the at least one managed node machine.

8. A computer implemented method as in claim 5, further comprising:
   a) instantiating at least one additional expression engine, each of which is associated with at least one of the at least one managed node machine;
   b) said proxy engine passing said first expression from said initiating engine to selected ones of said at least one additional expression engine;
   c) said selected ones of said at least one additional expression engine periodically,
      i) obtaining from at least one managed node machine with which it is associated, data required to evaluate said first expression; and
      ii) evaluating said first expression utilizing said data obtained from said at least one managed node machine, thereby generating a result;
   d) said selected ones of said at least one additional expression engine transmitting selected ones of said results to said proxy engine; and
   e) said proxy engine,
      i) generating compiled results from said selected ones of said results which it receives from said expression engines; and
      ii) transmitting selected ones of said compiled results to said initiating engine.

9. A computer implemented method as in claim 8, wherein the selected ones of the at least one additional expression engine comprise all of the at least one additional expression engine.

10. A computer implemented method as in claim 5, wherein for each of the first and at least one additional expression engines transmitting selected ones of said results, the selected ones of said results comprise results which differ from a previous result of said periodic evaluation of said first expression.

11. A computer implemented method as in claim 10, further comprising, at intervals, said initiating engine calling heartbeat methods of the first and at least one additional expression engines.

12. A computer implemented method as in claim 11, further comprising:
   a) instantiating a device selection component; and
   b) said proxy engine,
      i) receiving from said device selection component an indication as to which managed node machines comprise the at least one managed node machine;
      ii) receiving from said device selection component an indication as to where each of said first and at least one additional expression engines will be instantiated; and
      iii) determining said associations between said first and at least one additional expression engines, and said at least one managed node machine.

13. A computer implemented method as in claim 10, further comprising:
   a) instantiating a device selection component; and
   b) said proxy engine,
      i) receiving from said device selection component an indication as to which managed node machines comprise the at least one managed node machine;
      ii) receiving from said device selection component an indication as to where each of said first and at least one additional expression engines will be instantiated; and
      iii) determining said associations between said first and at least one additional expression engines, and said at least one managed node machine.

14. A computer implemented method as in claim 1, further comprising:
   a) instantiating a device selection component;
   b) said device selection component determining which managed node machines comprise the at least one managed node machine; and
   c) said device selection component determining where said first expression engine will be instantiated.

15. A computer implemented method as in claim 1, further comprising, at intervals, said initiating engine calling a heartbeat method of the first expression engine.

16. A computer implemented method as in claim 1, wherein said initiating engine is instantiated by an application container.

17. A computer implemented method as in claim 16, wherein said application container is a web-based application.

18. A computer implemented method as in claim 1, wherein said second machine is said first of the at least one managed node machine.

19. A computer implemented method as in claim 1, wherein said second machine is a machine nearest said first of the at least one managed node machine which is capable of hosting said first expression engine.

20. A computer implemented method as in claim 1, wherein said first expression engine is instantiated by:
   a) said initiating engine,
      i) creating said first expression engine; and then
      ii) initializing said first expression engine; and then
   b) said first expression engine obtaining properties, including said first expression, from said initiating engine.

21. A computer implemented method as in claim 20, wherein:
   a) said initiating engine creating and initializing said first expression engine comprises said initiating engine creating and initializing a proxy engine, which in turn creates and initializes said first expression engine;

b) said first expression engine obtaining properties from said initiating engine comprises said proxy engine obtaining properties from said initiating engine, and said first expression engine obtaining properties from said proxy engine; and c) said transmission of selected ones of said results from said first expression engine to said initiating engine comprises transmitting said selected ones of said results through said proxy engine.

22. A computer implemented method as in claim 20, wherein a property of said initiating engine is a target property indicating which managed node machines comprise the at least one managed node machine.

23. A computer implemented method as in claim 20, wherein a property of said initiating engine is an expression engine location property identifying the second machine on which the first expression engine is to be instantiated.

24. A computer implemented method as in claim 20, wherein a property of said initiating engine is an interval property which determines how often the first expression engine periodically obtains data and evaluates said first expression.

25. A computer implemented method as in claim 1, further comprising:
   a) said first expression engine periodically,
      i) obtaining from said first of the at least one managed node machine, data required to evaluate multiple instances of said first expression; and
      ii) evaluating said multiple instances of said first expression utilizing said data obtained from said first of the at least one managed node machine, thereby generating an N-dimensional array of results, where N is a number of data instances of said first expression which were evaluated; and
   b) said first expression engine transmitting selected ones of said N-dimensional arrays of results to said initiating engine.

26. A computer implemented method as in claim 1, further comprising passing at least one additional expression, to be evaluated in a similar fashion as said first expression, from said initiating engine to said first expression engine.

27. A computer implemented method as in claim 1, wherein the initiating engine comprises a first interface which allows it to behave as a control engine for any object implementing the first interface.

28. A computer implemented method as in claim 27, wherein said first interface comprises properties, including:
   a) an identifier to define a specification for the object type of said expression engine to create;
   b) the expression to be evaluated;
   c) a value that represents the evaluated expression;
   d) a first location of said managed node machine or group of managed node machines;
   e) a second location of said expression engine or group of expression engines where said expression engine should be created and executed;
   f) a first interval that defines how often said expression engine will evaluate said expression;
   g) a second interval that defines how often said initiating engine will call a heartbeat method of said expression engine to check said initiating engine's connection to said expression engine.
   h) a send continuous variable to indicate whether said expression engine should send all results of an evaluated expression to said initiating engine or only send them if said results are different than the results generated from a previous evaluation of said expression;
   i) a response state variable to indicate whether said connection between said initiating engine and said expression engine is a success or failure.

29. A computer implemented method as in claim 27, wherein said first interface comprises methods, including:
   a) an activate method to start the expression evaluation process;
   b) a deactivate method to end the expression evaluation process;
   c) a set value method to receive results of an evaluated expression.

30. A computer implemented method as in claim 27, wherein said control engine is a dashboard control engine which:
   a) processes said selected ones of said results; and then
   b) updates at least one dashboard control in response to said processing.

31. A computer implemented method as in claim 27, wherein said control engine is a dashboard background control engine that delegates processing of said selected ones of said results to an event receiver.

32. A computer implemented method as in claim 27, wherein the expression engine comprises a second interface which allows any object implementing the second interface to behave as an expression engine.

33. A computer implemented method as in claim 32, wherein said second interface comprises methods, including:
   a) an initialize method to initialize said expression engine;
   b) a finished method to stop said expression engine from evaluating expressions;
   c) a heartbeat method to monitor the connection between said initiating engine and said expression engine.

34. A computer implemented method of compiling diagnostic information for at least one managed node machine of a computer system, comprising:
   a) instantiating an initiating engine on a first machine;
   b) instantiating a first expression engine which is associated with a first of the at least one managed node machine;
   c) passing a first expression from said initiating engine to said first expression engine;
   d) said first expression engine periodically,
      i) obtaining from said first of the at least one managed node machine, data required to evaluate said first expression; and
      ii) evaluating said first expression utilizing said data obtained from the first of the at least one managed node machine, thereby generating a result; and
   e) said first expression engine transmitting a result of said evaluation of said first expression to said initiating engine when said result differs from a previous result of said evaluation of said first expression.

35. A computer implemented method as in claim 34, further comprising, at intervals, said initiating engine calling a heartbeat method of the first expression engine.

36. A computer implemented method as in claim 34, further comprising:
   a) instantiating a device selection component;
   b) said device selection component determining which managed node machines comprise the at least one managed node machine; and c) said device selection component determining where said expression engine will be instantiated.

37. A computer implemented method as in claim 34, further comprising passing at least one additional expression, to be evaluated in a similar fashion as said first expression, from said initiating engine to said first expression engine.

38. Apparatus for compiling diagnostic information for at least one managed node machine of a computer system, comprising:
   a) one or more computer readable storage mediums; and
   b) computer readable program code stored in the one or more computer readable storage mediums, the computer readable program code comprising:
      i) program code for causing an initiating engine to be instantiated on a first machine;
      ii) program code for causing a first expression engine to be instantiated on a second machine, said first expression engine being associated with a first of the at least one managed node machine;
      iii) program code for causing said initiating engine to pass a first expression to said first expression engine;
      iv) program code for causing said first expression engine to periodically,
         A) obtain from said first of the at least one managed node machine, data required to evaluate said first expression; and
         B) evaluate said first expression utilizing said data obtained from said first of the at least one managed node machine, to thereby generate a result; and
      v) program code for causing said first expression engine to transmit selected ones of said results to said initiating engine.

39. Apparatus as in claim 38, wherein the selected ones of said results comprise results which differ from a previous result of said periodic evaluation of said first expression.

40. Apparatus as in claim 38, wherein the computer readable program code further comprises program code for causing a proxy engine to be instantiated, wherein:
   a) said program code for causing said initiating engine to pass a first expression to said first expression engine causes said first expression to be passed through said proxy engine; and
   b) said program code for causing said first expression engine to transmit selected ones of said results to said initiating engine causes said selected ones of said results to be passed through said proxy engine.

41. Apparatus as in claim 38, wherein the computer readable program code further comprises:
   a) program code for causing a device selection component to be instantiated;
   b) program code for causing said device selection component to determine which managed node machines comprise the at least one managed node machine; and
   c) program code for causing said device selection component to determine where said first expression engine will be instantiated.

42. Apparatus as in claim 38, wherein the computer readable program code further comprises program code for causing said initiating engine to call a heartbeat method of the first expression engine at intervals.

43. Apparatus for compiling diagnostic information for at least one managed node machine of a computer system, comprising:
   a) one or more computer readable storage mediums; and
   b) computer readable program code stored in the one or more computer readable storage mediums, the computer readable program code comprising:
      i) program code for causing an initiating engine to be instantiated on a first machine;
      ii) program code for causing a first expression engine to be instantiated, said first expression engine being associated with a first of the at least one managed node machine;
      iii) program code for causing said initiating engine to pass a first expression to said first expression engine;
      iv) program code for causing said first expression engine to periodically,
         A) obtain from said first of the at least one managed node machine, data required to evaluate said first expression; and
         B) evaluate said first expression utilizing said data obtained from the first of the at least one managed node machine, to thereby generate a result; and
      v) program code for causing said first expression engine to transmit a result of said evaluation of said first expression to said initiating engine when said result differs from a previous result of said evaluation of said first expression.

44. Apparatus as in claim 43, wherein the computer readable program code further comprises code for causing said initiating engine to call a heartbeat method of the first expression engine at intervals.

* * * * *

UNITED STATES PATENT AND TRADEMARK OFFICE
CERTIFICATE OF CORRECTION

PATENT NO. : 6,167,533
DATED : December 26, 2000
INVENTOR(S) : Robert Allen Potterveld et al.

It is certified that error appears in the above-identified patent and that said Letters Patent is hereby corrected as shown below:

Column 13,
Line 39, after "comprising" insert -- , --

Column 14,
Line 2, after "expression;" insert -- and --
Line 11, after "process;" insert -- and --
Line 34, after "expressions;" insert -- and --

Signed and Sealed this

Twenty-sixth Day of November, 2002

Attest:

Attesting Officer

JAMES E. ROGAN
Director of the United States Patent and Trademark Office